(12) United States Patent
Easttom

(10) Patent No.: US 11,080,396 B1
(45) Date of Patent: Aug. 3, 2021

(54) SECURE DOWNLOADS

(75) Inventor: William C. (Chuck) Easttom, McKinney, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 1090 days.

(21) Appl. No.: 13/194,935

(22) Filed: Jul. 30, 2011

Related U.S. Application Data

(60) Provisional application No. 61/370,601, filed on Aug. 4, 2010.

(51) Int. Cl.
*G06F 21/56* (2013.01)
*H04L 29/06* (2006.01)

(52) U.S. Cl.
CPC ............ *G06F 21/56* (2013.01); *G06F 21/566* (2013.01); *H04L 63/145* (2013.01)

(58) Field of Classification Search
CPC ....... H04L 63/145; G06F 21/56; G06F 21/566
USPC ..................................... 726/22–25
See application file for complete search history.

(56) References Cited

U.S. PATENT DOCUMENTS

| 5,305,456 | A | 4/1994 | Boitano |
| 5,974,549 | A | 10/1999 | Golan |
| 7,107,618 | B1 | 9/2006 | Gordon |
| 2005/0283497 | A1* | 12/2005 | Nurminen ............... G06Q 10/10 |
| 2006/0021029 | A1* | 1/2006 | Brickell .................. G06F 21/51 726/22 |
| 2006/0085852 | A1* | 4/2006 | Sima ............................... 726/22 |
| 2007/0101146 | A1 | 5/2007 | Louch et al. |
| 2007/0174915 | A1* | 7/2007 | Gribble et al. ................. 726/24 |

OTHER PUBLICATIONS

J. Galbraith and O. Saarenmaa, "SSH File Transfer Protocol", draft-ietf-secsh-filexfer-13.txt, Jul. 10, 2006, pp. 1-61.*
Microsoft, "Microsoft Windows XP—Users overview", p. 1, archived on Jun. 29, 2009, obtained from https://web.archive.org/web/20090629060950/http://www.microsoft.com/resources/documentation/windows/xp/all/proddocs/en-us/lsm_local_users.mspx.*

* cited by examiner

*Primary Examiner* — Jeffrey D. Popham

(57) ABSTRACT

An apparatus, method, and a computer program are provided in order to allow for secure downloading of data to a host operating system. The host operating system transmits a request to a virtual machine in order download the data from the Internet. In response, the virtual machine downloads the data and scans the data for malicious programs. If the result of the scan is negative, then the host operating system is configured to download the data from the virtual machine.

17 Claims, 6 Drawing Sheets

SECURE DOWNLOADS

CROSS-REFERENCE TO RELATED APPLICATION

This application claims the benefit of U.S. Provisional Application No. 61/370,601, filed on Aug. 4, 2010. The subject matter of the earlier filed application is hereby incorporated by reference in its entirety.

FIELD

The present invention relates to secure downloads and, more particularly, to an apparatus and method that facilitates secure downloads.

BACKGROUND

Security is a significant concern for entities or individuals when communicating or downloading data over the Internet. Currently, there are systems that embed security monitoring programs into an application, such as a Web browser, in order monitor any downloaded components to search for any security issues, such as viruses, worms, spyware, etc. Other programs are provided that are cryptographically signed in order to provide for safe distribution over a network. There are also other programs that determine whether the data being downloaded is free from viruses by comparing the data file with a known virus data file. However, applications as described above do not guarantee that the software, data, and/or attachments are truly safe to be downloaded. Instead, such applications merely reduce the risk for some cases of unsafe downloads, and as such, do not eliminate the problem of unsafe downloads.

SUMMARY

Certain embodiments of the present invention may provide solutions to the problems and needs in the art that have not yet been fully identified, appreciated, or solved by current anti-virus or software security programs.

In accordance with an embodiment of the present invention, a computer-implemented method is provided. The method includes receiving, at a virtual machine, a request to download data from the Internet. The request is received using a Secure Shell. The method also includes downloading the data from the Internet and scanning the downloaded data.

In accordance with another embodiment of the present invention, an apparatus is provided. The apparatus includes a processor and a set of instructions. The set of instructions is configured to cause the processor to receive, at a virtual machine, a request to download data from the Internet, as well as download the data from the Internet and scan the downloaded data. The request is received using a Secure Shell.

In accordance with yet another embodiment of the present invention, a computer program embodied on a non-transitory computer readable medium is provided. The computer program is configured to cause the processor to receive, at a virtual machine, a request to download data from the Internet, as well as download the data from the Internet and scan the downloaded data. The request is received using a Secure Shell.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein pertain to an apparatus and/or method that provides a host operating system with a default virtual machine. Unlike most virtual machines, the virtual machine described herein is relatively small in size. For example, the virtual machine may use approximately 5 percent of the total hard drive space.

In addition, the virtual machine may have an OS identical to the host operating system. For instance, if the host OS is Windows 7®, then the OS of the virtual machine may also be Windows 7®. It should be appreciated that most virtual machines use alternative operating systems, such as Linux® on a Windows® machine. However, the purpose of the virtual machine in some embodiments described herein is to allow testing of downloaded components and data prior to transferring the downloaded components and data to the host. Thus, the virtual machine can have the same OS (including patches and updates) as the host machine.

Furthermore, the virtual machine OS may mirror the host OS configuration including ports, user accounts, etc., in order to allow the downloaded data to be fully tested. Any differences in configuration between the host OS and the virtual machine OS may lead to different conditions existing in each, which may affect any testing done on the virtual machine and make such testing inapplicable to the host OS.

Generally, a virtual machine can have a drive mapped to the host OS in order to allow files to be copied to and from the host OS. However, in the embodiments described herein, there is no access from the virtual machine to the host OS because the virtual machine does not have a drive mapped to the host OS.

Figure 1:
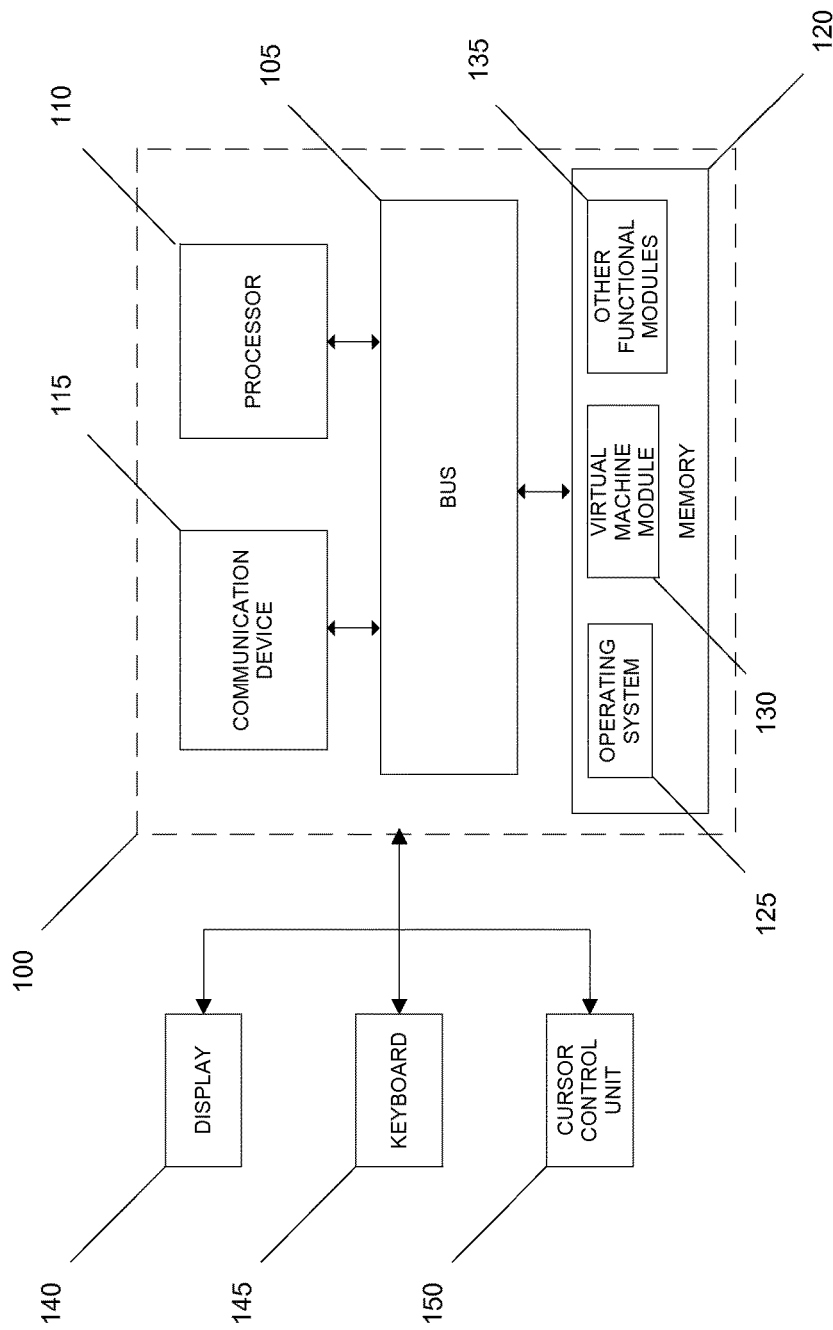
FIG. 1 illustrates a block diagram of a system for secure downloading that can be implemented in one or more embodiments of the present invention.

FIG. 1 illustrates a block diagram of a system 100 for secure downloading that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of non-transitory computer readable medium. System 100 may also include a communication device 115, such as a network interface card, that may provide access to a network or Internet.

The computer readable medium may be any available media that can be accessed by processor 110. The computer readable medium may include both volatile and nonvolatile media, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100, such as requesting data to be downloaded from the Internet.

According to one embodiment, memory 120 may store software modules that may provide functionality when executed by processor 110. The modules can include an operating system 125 and a virtual machine module 130, as well as other functional modules 135. Operating system 125 may provide operating system functionality for system 100. Because system 100 may be part of a larger system, system 100 may include one or more additional functional modules 135 to include the additional functionality.

Figure 2:
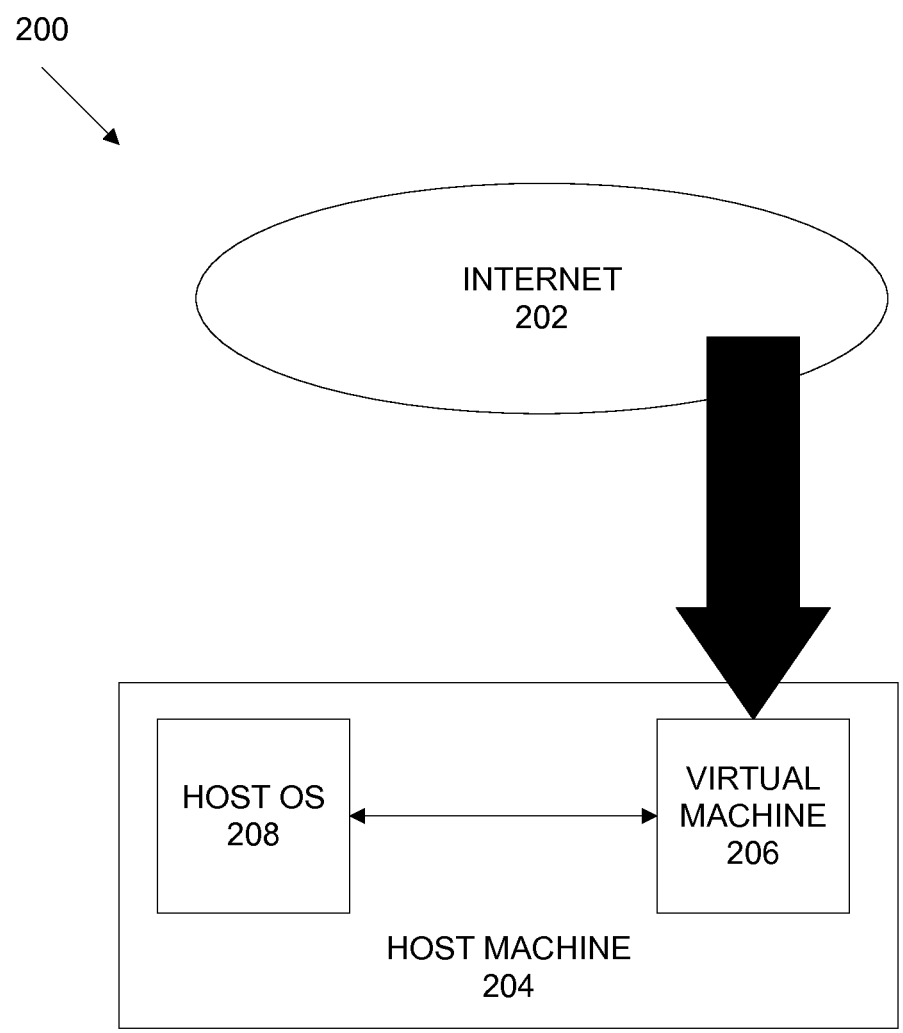
FIG. 2 illustrates a system that securely downloads data, in accordance with one embodiment of the present invention.

FIG. 2 illustrates a system 200 that securely downloads data, in accordance with one embodiment of the present invention. FIG. 2 shows a machine 204 that includes, among other components, a virtual machine 206 and a host OS 208. In this embodiment, when software is downloaded from Internet 202, the software is temporarily stored in memory (and not stored on the hard drive) and sent to virtual machine 206. The transmission of data to virtual machine 206 may be accomplished via Secure Copy (SCP) with Secure Shell (SSH). However, in another embodiment, the data may be transferred using Telnet, Secure File Transfer Protocol (SFTP), or any other remote access process and/or protocol that would be appreciated by a person of ordinary skill in the art. After virtual machine 206 completes testing of the downloaded data, host OS 208 may copy the downloaded data from virtual machine 206 using SFTP or SCP.

Figure 3:
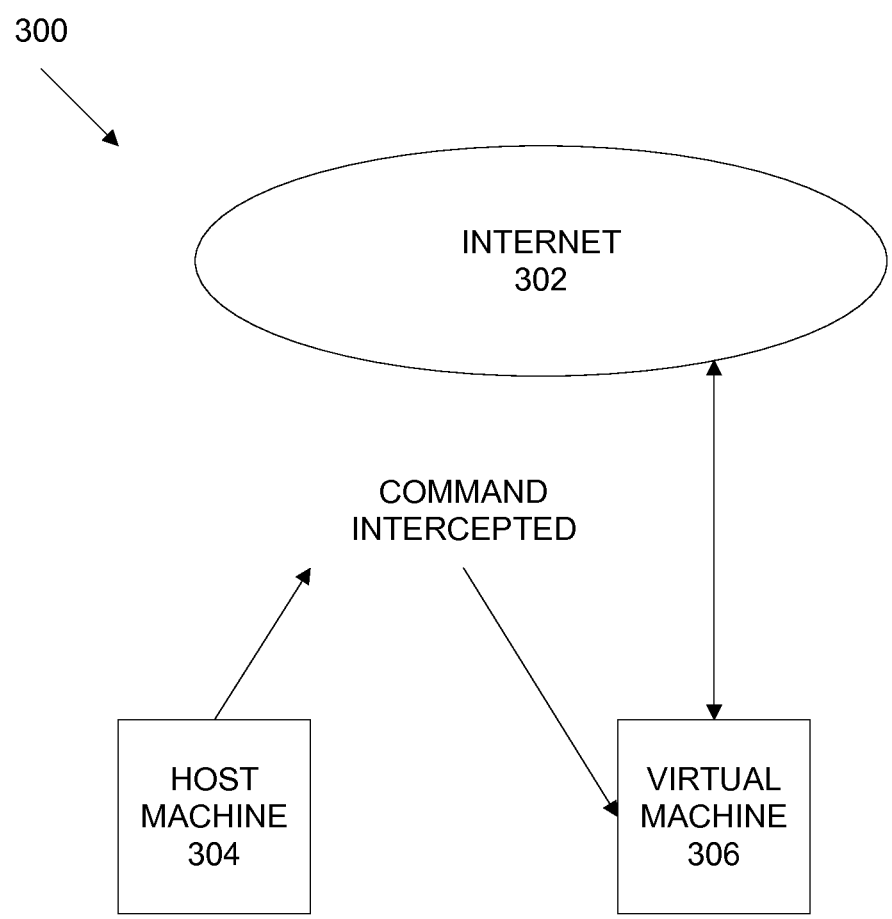
FIG. 3 illustrates a system that securely downloads data, in accordance with another embodiment of the present invention.

FIG. 3 illustrates a system 300 that securely downloads data, in accordance with another embodiment of the present invention. In this embodiment, a host machine 304 is modified such that any data downloaded via FTP, Hypertext Transfer Protocol (HTTP), or other download mechanisms can be re-routed to an Internet Protocol (IP) address of a virtual machine 306. For instance, any request (such as clicking on a download link in a browser) initiated by a user can trigger an SSH message to be sent to virtual machine 306. The message can include the IP address or Uniform Resource Locator (URL) of the download and instruct virtual machine 306 to execute the download of the data from Internet 302. Once the data is downloaded on virtual machine 306, the data having malware (or viruses, spyware, Trojan horses, adware, worms, etc.) would have zero effect on the host machine.

It should be appreciated that once the data is downloaded from a location on Internet 302, virtual machine 306 may, among other functions, perform a full virus scan. For added security, virtual machine 306 is prevented from transmitting any communications to the host machine 304. For instance, virtual machine 306 is prevented from transmitting a notification to host machine 304 that the virus scan is complete and that host machine 304 can receive data. Rather, host machine 304 may periodically query virtual machine 306 (e.g., using SSH) to determine whether the virus scan is complete and determine whether the result of the virus scan is negative (i.e., no malware or viruses). If the virus scan determines that the result of the scan is negative, then host machine 304 initiates a SCP (e.g., using SSH) or a SFTP connection to virtual machine 306 in order to copy or receive the verified downloaded data from virtual machine 306 and store the verified downloaded data to the hard drive (not shown). Once host machine 304 receives the data, virtual machine 306 is configured to delete the data from virtual machine 306, thus leaving space for the next set of downloaded data to be tested.

Figure 4:
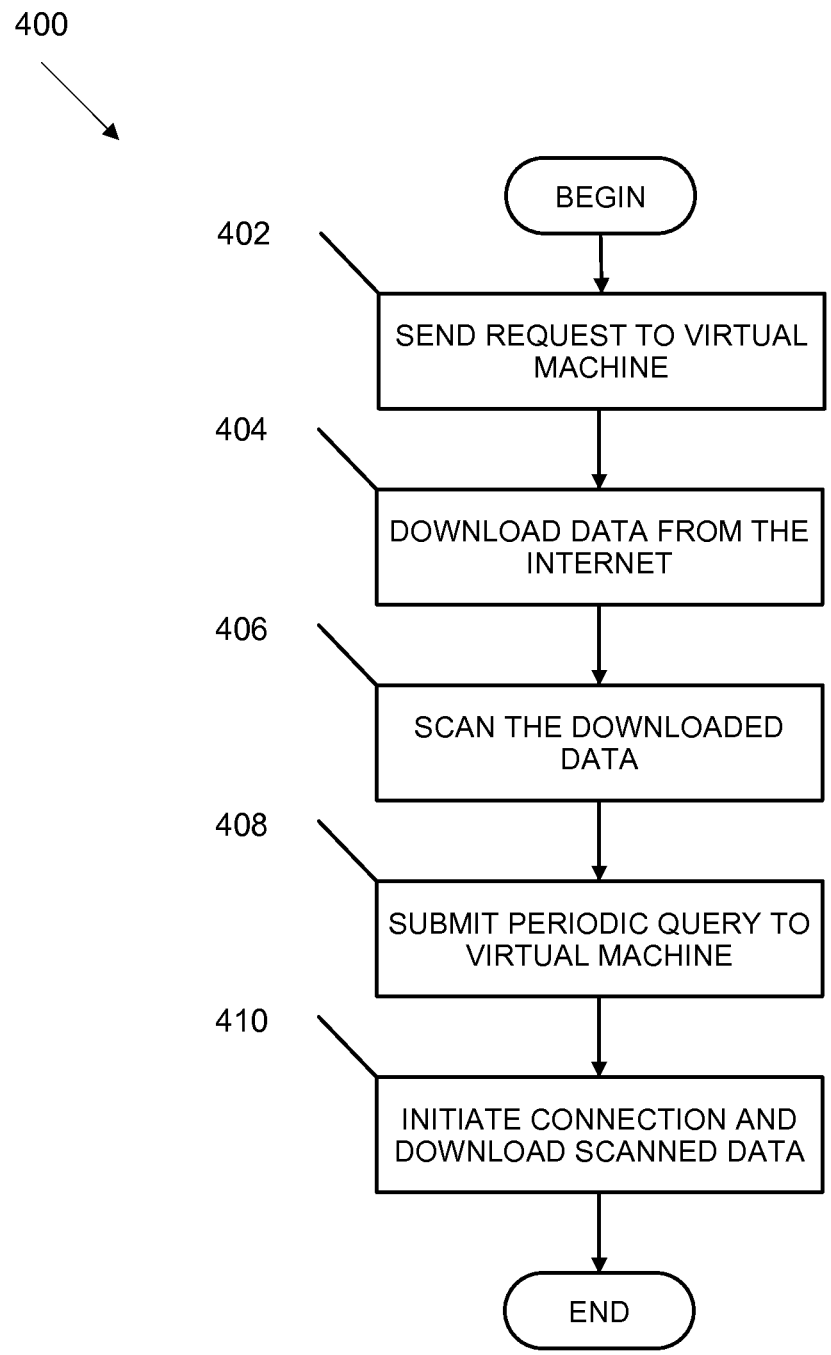
FIG. 4 illustrates a process for communicating between the virtual machine and host operating system (OS), in accordance with another embodiment of the present invention.

FIG. 4 illustrates a process 400 for communicating between the virtual machine and host operating system (OS), in accordance with another embodiment of the present invention. At 402, the host OS uses SSH to send a request to the virtual machine requesting that virtual machine download a given file/data/component. The request may include the URL or IP address in order to download the data. At 404, the virtual machine downloads the data and begins scanning at 406. The scanning may be a simple virus scan, or a more comprehensive scan that would be appreciated by a person of ordinary skill in the art. For example, in another embodiment, additional testing can be performed on the virtual machine for some rather infamous viruses. One test that can be performed on the virtual machine can be to increase the system time by one year and examine the results. In yet other embodiments, additional tests can be performed including monitoring to determine if the data downloaded attempted to alter the Windows® Registry (for Windows® systems), affect system logs, open any ports, scan any documents, or conduct any other undesirable activities. While this process may introduce a delay on downloads of anywhere from a few minutes to a few hours (depending on the scans and tests done), such a process would facilitate truly safe downloads from the Internet. This is something that has been unattainable by previous methods.

At 408, the host OS periodically queries the virtual machine via SSH as to the status (e.g., scan complete and result) of the scan. If the virtual machine does not respond to the query, then the host machine continues to periodically query the virtual machine as to the status of the scan. The query can be set up for every minute, every five minutes, or any time period that would be appreciated by a person of ordinary skill in the art.

If the virtual machine responds to the query and the result is negative (i.e., no malware or viruses found), then the host OS initiates at 410 a SCP or SFTP connection to the virtual machine and downloads the verified data. In order to completely isolate the virtual machine from the host OS, the virtual machine can only be accessed via secure communication (e.g., SSH, STP, etc.). Also, for the same reason, communication with the virtual machine may only be one way (e.g., from the host to the virtual machine), and the virtual machine may be unable to initiate any communication with the host OS.

Figure 5:
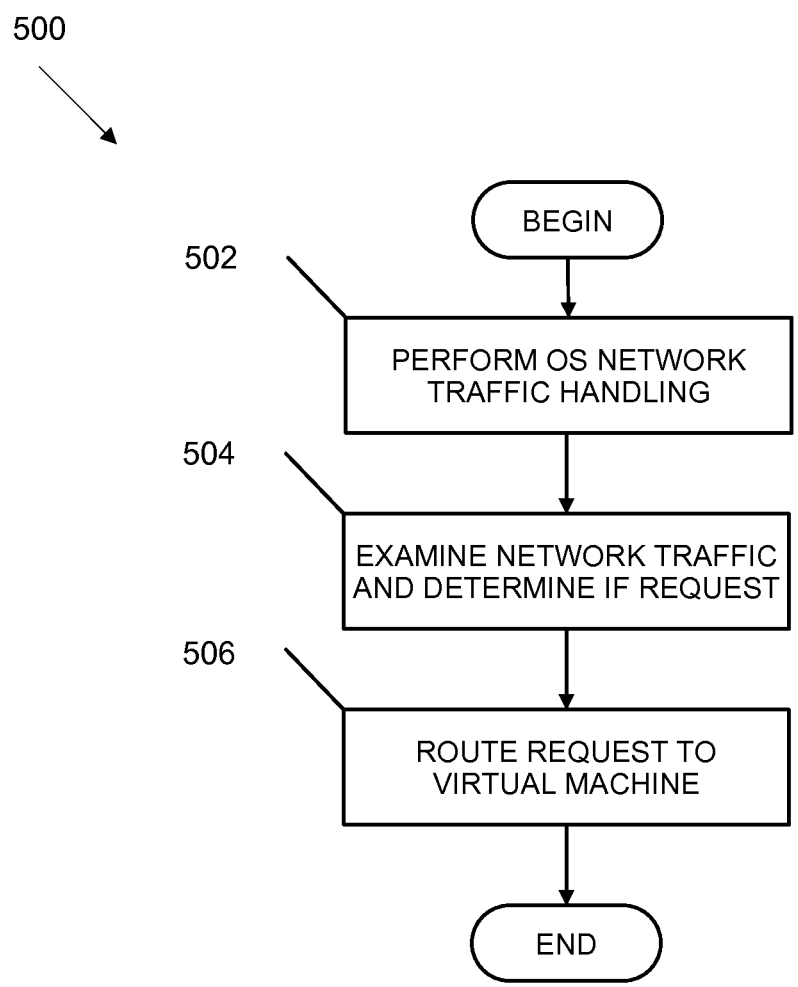
FIG. 5 illustrates a process to implement the virtual machine, in accordance with an embodiment of the present invention.

FIG. 5 illustrates a process 500 to implement the virtual machine, in accordance with an embodiment of the present invention. In this embodiment, the virtual machine can be integrated into the operating system by an operating system vendor. As a result, any requests for downloads would be routed through a security system of the virtual machine. For example, in Windows® OS, all network traffic is routed through a few Dynamic Linked Libraries (DLLs). An additional DLL can be added to the operating system in order to allow the virtual machine to be integrated into the OS.

At 502, the host OS performs operating system network traffic handling. A DLL is created to intercept at 504 all network downloads by the host OS. For example, the DLL examines all network traffic and determines if the request is for downloading data. If the network traffic is a download request, then the DLL routes at 506 the downloaded data to the VM. If the network traffic is not a download request, then the network traffic is simply sent to the network. A similar process may be adapted for other operating systems such as Unix, Linux, Free BSD, etc.

Figure 6:
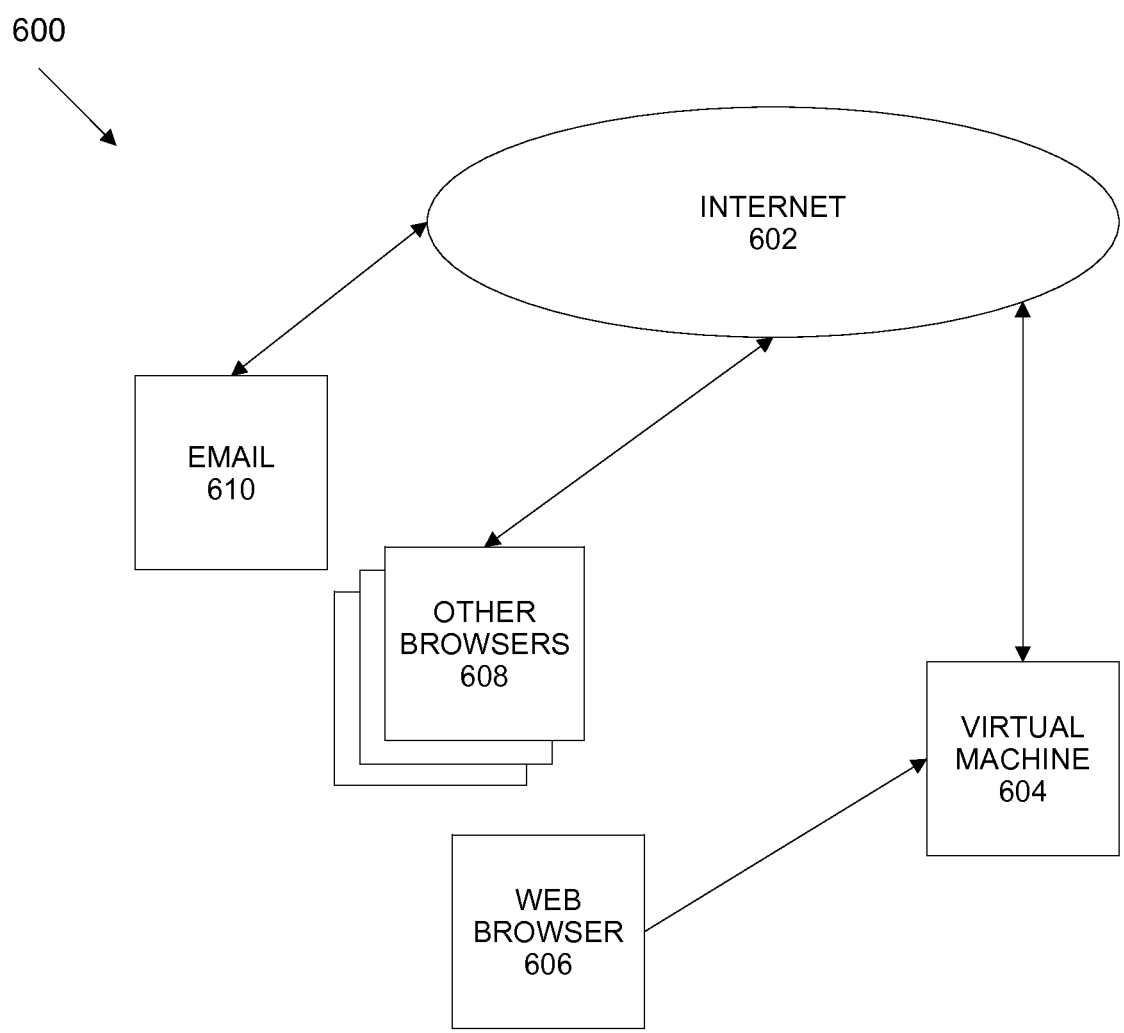
FIG. 6 illustrates a system that implements a virtual machine, in accordance with an embodiment of the present invention.

FIG. 6 illustrates a system 600 that implements a virtual machine 604, in accordance with an embodiment of the present invention. In this embodiment, a DLL or a similar application may be embedded within a Web browser 606. This way, any download request made via a Web browser 606 can be routed to virtual machine 604. This essentially makes Web browser 606 a more secure alternative than other browsers 608, which do not include the embedded application. Also, downloads via email links 610, other browsers 608, or other sources utilized to download data also may not be protected because such links, browsers, or sources may not have the embedded application to route data to be downloaded by virtual machine 604.

In another embodiment, a separate program (or product) can be installed on a given system. For instance, the host operating system can be modified (such as changing the registry in Windows®) so that download requests would be routed to the security system of the virtual machine.

The method steps shown in FIGS. 4 and 5 may be performed, in part, by a computer program, encoding instructions for a nonlinear adaptive processor to cause at least the methods described in FIGS. 4 and 5 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 4 and 5, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It should be appreciated that a safe method to download data from the Internet is to install the downloaded data on a separate machine and scan the data for viruses or malware. If the test reveals that the data is safe, then the data can be installed on the target machine. The embodiments described herein accomplish that very method by utilizing an isolated virtual machine and routing downloads through the virtual machine. This is functionally equivalent to installing the data on a separate machine and testing the data. By integrating this process into an operating system, the entire operating system is more secure from malicious Internet downloads. Also, if this process is implemented into a Web browser, then the data downloaded from the Web browser would also be more secure.

The virtual machine creates a virtual environment for the operating systems to run, isolated from the real operating system in the host computer, so problems (e.g., viruses, blue screens, etc.) that may affect the virtual machine will not affect the host. In fact, one cannot copy files directly from the host to or from the virtual machine. Instead, one utilizes the technology described above in order to allow one to access a remote machine. Thus, the virtual machine is effectively a separate machine that provides for secure downloads.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   receiving, at a virtual machine, a request from a host operating system to download data from the Internet, wherein the request is received by way of secure shell (SSH) and comprises an Internet Protocol (IP) address or uniform resource locator (URL) of the data and instructions for the virtual machine to execute the download of the data;
   downloading, by the virtual machine, the data from the Internet to scan the downloaded data;
   scanning, by the virtual machine, the downloaded data, wherein the scanning of the downloaded data further comprises determining whether the downloaded data attempted to alter a registry, changed system logs, opened one or more ports, or any combination thereof;
   periodically receiving a query from the host machine regarding a status of the scanning of the downloaded data via secure shell, wherein the query is periodically received until the virtual machine responds to the query; and
   transmitting, by the virtual machine, a copy of verified downloaded Internet data to the host machine, when the host machine initiates a secure copy (SCP) or secure file transfer protocol (SFTP) connection with the virtual machine, wherein the connection between the virtual machine and host machine is only initiated by the host machine and the virtual machine is unable to initiate communication with an operating system of the host machine.

2. The computer-implemented method of claim 1, wherein the request to download the data comprises an Internet Protocol address or a Uniform Resource Locator of the data located on the Internet and instructions to download the data.

3. The computer-implemented method of claim 1, wherein the scanning comprises at least scanning the data for malware, viruses, spyware, Trojan horses, adware, and worms.

4. The computer-implemented method of 1, further comprising:
   transmitting a status message pertaining to the scanning of the data in response to the periodic query.

5. The computer-implemented method of claim 4, further comprising:
   when the status message indicates that scanning is complete, transmitting the scanned data to the host operating system via a Secure Protocol or Secure File Transfer Protocol in order to allow the host operating system to download the scanned data.

6. The computer-implemented method of claim 1, wherein the receiving of the request comprises receiving the request from a Web browser embedded with instructions configured to request the virtual machine to download the data from the Internet or from a Document Linked Library within the host operating system configured to intercept a download request and transmit the download request to the virtual machine.

7. An apparatus, comprising:
   a processor; and
   memory comprising a set of instructions, wherein the set of instructions is configured to cause the processor to:
      receive from a host machine, at a virtual machine, a request from a host operating system to download data from the Internet, wherein the request is received by way of secure shell (SSH) and comprises an Internet Protocol (IP) address of the virtual machine or uniform resource locator (URL) of the data and instructions for the virtual machine to execute the download of the data, and
      download the data from the Internet onto the virtual machine and scan the downloaded data, wherein the scanning of the downloaded data further comprises determine if the downloaded data attempted to alter a registry, changed system logs, opened one or more ports, or any combination thereof;
      periodically receive a query from the host machine regarding a status of the scanning of the downloaded data via secure shell, wherein the query is periodically received until the virtual machine responds to the query; and
      transmit a copy of verified downloaded data from the virtual machine to the host machine, when the host machine initiates a secure copy (SCP) or secure file transfer protocol (SFTP) connection with the virtual machine, wherein the connection between the virtual machine and host machine is only initiated by the host machine and the virtual machine is unable to initiate communication with an operating system of the host machine.

8. The apparatus of claim 7, wherein the request to download the data comprises an Internet Protocol address or a Uniform Resource Locator of the data located on the Internet and instructions to download the data.

9. The apparatus of claim 7, wherein the set of instructions is further configured to cause the processor to scan the data for malware, viruses, spyware, Trojan horses, adware, and worms.

10. The apparatus of 7, wherein the set of instructions is further configured to cause the processor to:
    transmit a status message pertaining to the scanning of the data in response to the periodic query.

11. The apparatus of claim 10, wherein the set of instructions is further configured to cause the processor to:
    when the status message indicates that scanning is complete, transmit the scanned data to the host operating system via a Secure Protocol or Secure File Transfer Protocol in order to allow the host operating system to download the scanned data.

12. The apparatus of claim 7, wherein the request is received from a Web browser embedded with instructions configured to request the virtual machine to download the data from the Internet or from a Document Linked Library within the host operating system configured to intercept a download request and transmit the download request to the virtual machine.

13. A computer program embodied on a non-transitory computer readable medium, the computer program configured to cause a processor to:
    receive from a host operating system, at a virtual machine, a request to download data from the Internet, wherein the request is received by way of secure shell (SSH) and comprises an Internet Protocol (IP) address of the virtual machine or uniform resource locator (URL) of the data and instructions for the virtual machine to execute the download of the data;
    download to a virtual machine the data from the Internet; and
    scan the downloaded data, wherein the scanning of the downloaded data further comprises determine if the downloaded data attempted to alter a registry, changed system logs, opened one or more ports, or any combination thereof;
    periodically receive a query from the host machine regarding a status of the scanning of the downloaded data via secure shell, wherein the query is periodically received until the virtual machine responds to the query;
    transmit a copy of verified downloaded Internet data from the virtual machine to the host machine, when the host machine initiates a SCP or SFTP connection with the virtual machine, wherein the connection between the virtual machine and the host machine is only initiated by the host machine and the virtual machine is unable to initiate communication with an operating system of the host machine.

14. The computer program of claim 13, wherein the request comprises an Internet Protocol address or a Uniform Resource Locator of the data located on the Internet and instructions to download the data.

15. The computer program of claim 13, wherein the computer program is further configured to cause the processor to scan the data for malware, viruses, spyware, Trojan horses, adware, and worms.

16. The computer program of claim 13, wherein the computer program is further configured to cause the processor to transmit a status message pertaining to the scanning of the data in response to the periodic query.

17. The computer program of claim 16, wherein the computer program is further configured to cause the processor to:
  when the status message indicates that scanning is complete, transmit the scanned data to the host operating system via a Secure Protocol or Secure File Transfer Protocol in order to allow the host operating system to download the scanned data.

* * * * *